US011877193B2

(12) United States Patent
Kuppelur et al.

(10) Patent No.: US 11,877,193 B2
(45) Date of Patent: *Jan. 16, 2024

(54) ENHANCED INTERNET PROTOCOL MULTIMEDIA SUBSYSTEM CALL HANDLING

(71) Applicant: Intel Corporation, Santa Clara, CA (US)

(72) Inventors: Nitin Kuppelur, Bangalore (IN); Deepak Dash, Khordha (IN); Robert Zaus, Munich (DE); Shashanka Totadamane Ramappa, Shimoga (IN); Vivek G. Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,262

(22) Filed: Dec. 19, 2022

(65) Prior Publication Data

US 2023/0119871 A1  Apr. 20, 2023

Related U.S. Application Data

(63) Continuation of application No. 16/645,278, filed as application No. PCT/US2018/058958 on Nov. 2, 2018, now Pat. No. 11,576,086.

(Continued)

(51) Int. Cl.
*H04W 36/00* (2009.01)
*H04W 76/18* (2018.01)
(Continued)

(52) U.S. Cl.
CPC ....... *H04W 36/0022* (2013.01); *H04W 48/18* (2013.01); *H04W 76/18* (2018.02); *H04W 76/38* (2018.02); *H04W 76/50* (2018.02)

(58) Field of Classification Search
CPC . H04W 36/0022; H04W 76/18; H04W 76/38; H04W 76/50; H04W 48/18
(Continued)

(56) References Cited

U.S. PATENT DOCUMENTS 11,576,086 B2   2/2023   Kuppelur et al.
2004/0023651 A1 2/2004   Gollnick et al.
(Continued)

FOREIGN PATENT DOCUMENTS

CN   103891388 A   6/2014
CN   111165065 A   5/2020
(Continued)

OTHER PUBLICATIONS

3GPP TS 24.301 V15.0.1 (Sep. 2017) 3rd Generation Partnership Project; Technical Specification Group Core Network and Terminals; Non-Access-Stratum (NAS) protocol for Evolved Packet System (EPS); Stage 3 (Release 15) (Year: 2017).*

(Continued)

*Primary Examiner* — Michael Y Mapa
(74) *Attorney, Agent, or Firm* — Schwegman Lundberg & Woessner, P.A.

(57) ABSTRACT

Systems and methods of enabling access for non-emergency voice calls are described. A UE operates in a network supporting voice services via a multitude of RATs. The UE attempts to access the network via a first RAT offering voice services and data services. If the UE does not receive a response from the network within a first time period, the UE re-attempts the access to the network via the first RAT. If the number of access attempts for which the UE does not receive a response is at least a threshold value, the UE refrains during a second time period from further access attempts via the first RAT for the purpose of receiving data services, and (Continued)

continues to attempt access via the first or second RAT for the purpose of receiving voice services.

13 Claims, 10 Drawing Sheets

Related U.S. Application Data

(60) Provisional application No. 62/587,649, filed on Nov. 17, 2017.

(51) Int. Cl.
*H04W 76/38* (2018.01)
*H04W 76/50* (2018.01)
*H04W 48/18* (2009.01)

(58) Field of Classification Search
USPC .............................. 370/331; 455/435.1–444
See application file for complete search history.

(56) References Cited

U.S. PATENT DOCUMENTS

| | | |
|---|---|---|
| 2012/0039167 A1 | 2/2012 | Swaminathan et al. |
| 2012/0044869 A1 | 2/2012 | Tiwari |
| 2014/0269275 A1 | 9/2014 | Jun et al. |
| 2014/0355417 A1 | 12/2014 | Kim et al. |
| 2015/0126147 A1* | 5/2015 | Koskela ................. H04W 4/90 455/404.1 |
| 2016/0127884 A1 | 5/2016 | Kim et al. |
| 2020/0228578 A1* | 7/2020 | Jia ......................... H04W 76/36 |
| 2020/0305032 A1 | 9/2020 | Kuppelur et al. |

FOREIGN PATENT DOCUMENTS

| | | |
|---|---|---|
| KR | 20120033470 A | 4/2012 |
| WO | WO-2017171920 A1 | 10/2017 |
| WO | WO-2017176071 A1 | 10/2017 |
| WO | WO-2019099212 A1 | 5/2019 |

OTHER PUBLICATIONS

U.S. Appl. No. 16/645,278, filed Mar. 6, 2020, Enhanced Internet Protocol Multimedia Subsystem Call Handling.

"3GPP: TSGCNT; Non-Access-Stratum (NAS) protocol for Evolved Packet System (EPS); Stage 3 (Release 15)", 3GPP TS 24.301 V15.0.1, (Sep. 22, 2017).

"3rd Generation Partnership Project; Technical Specification Group Core Network and Terminals; Non-Access-Stratum (NAS) protocol for Evolved Packet System (EPS); Stage 3 (Release 15)", 3GPP Standard ; Technical Specification ; 3GPP TS 24.301, 3rd Generation Partnership Project (3GPP), Mobile Competence Centre ; 650, Route Des Lucioles ; F-06921 Sophia-Anti Polis Cedex ; France, vol. CT WG1, No. V15.0.0, (Sep. 22, 2017), 1-496.

"U.S. Appl. No. 16/645,278, 312 Amendment filed Oct. 17, 2022", 6 pgs.

"U.S. Appl. No. 16/645,278, Examiner Interview Summary dated Sep. 14, 2022", 3 pgs.

"U.S. Appl. No. 16/645,278, Final Office Action dated Aug. 16, 2022", 31 pgs.

"U.S. Appl. No. 16/645,278, Non Final Office Action dated Jan. 27, 2022", 23 pgs.

"U.S. Appl. No. 16/645,278, Notice of Allowance dated Sep. 28, 2022", 13 pgs.

"U.S. Appl. No. 16/645,278, Preliminary Amendment filed Mar. 6, 2020", 9 pgs.

"U.S. Appl. No. 16/645,278, PTO Response to Rule 312 Communication dated Nov. 21, 2022", 2 pgs.

"U.S. Appl. No. 16/645,278, Response filed Apr. 25, 2022 to Non Final Office Action dated Jan. 27, 2022", 10 pgs.

"U.S. Appl. No. 16/645,278, Response filed Sep. 15, 2022 to Final Office Action dated Aug. 16, 2022", 11 pgs.

"U.S. Appl. No. 16/645,278, Response filed Oct. 11, 2021 to Restriction Requirement dated Aug. 12, 2021", 9 pgs.

"U.S. Appl. No. 16/645,278, Restriction Requirement dated Aug. 12, 2021", 10 pgs.

"Chinese Application Serial No. 201880062979.1, Voluntary Amendment Filed Mar. 3, 2021", With English claims, 21 pages.

"European Application Serial No. 18880022.1, Extended European Search Report dated Jul. 9, 2021", 13 pgs.

"Indian Application Serial No. 202047010162, First Examination Report dated Sep. 23, 2021", 5 pgs.

"International Application Serial No. PCT/US2018/058958, International Preliminary Report on Patentability dated May 28, 2020", 8 pgs.

"International Application Serial No. PCT/US2018/058958, International Search Report dated Feb. 14, 2019", 3 pgs.

"International Application Serial No. PCT/US2018/058958, Written Opinion dated Feb. 14, 2019", 6 pgs.

"Naming service request guard timer", Intel Mobile France 3GPP Draft; 24301 CR2333R2 (Rel-13) CI-161452, 3rd Generation Partnership Project (3GPP), Mobile Competence Centre ; 650, Route Des Lucioles ; F-06921 Sophia-Antipolis Cedex ; France 9 vol. CT, (Mar. 6, 2016).

"Chinese Application Serial No. 201880062979.1, Office Action dated Apr. 22, 2023", w/o English translation, 10 pgs.

Huawei, Hisilicon, "Indication of support of emergency bearer services when UE accesses via NB-S1 mode", C1-161880, (Apr. 4, 2016).

"Chinese Application Serial No. 201880062979.1, Response Filed Aug. 28, 2023 to Office Action dated Apr. 22, 2023", W English Claims, 23 pgs.

"European Application Serial No. 18880022.1, Communication Pursuant to Article 94(3) EPC dated Oct. 20, 2023", 6 pgs.

\* cited by examiner

ENHANCED INTERNET PROTOCOL MULTIMEDIA SUBSYSTEM CALL HANDLING

PRIORITY CLAIM

This is a continuation of U.S. patent application Ser. No. 16/645,278, filed Mar. 6, 2020, which is a U.S. National Stage Filing under 35 U.S.C. 371 from International Application No. PCT/US2018/058958, filed Nov. 2, 2018 and published in English as WO 2019/099212 on May 23, 2019, which claims the benefit of priority to U.S. Provisional Patent Application Ser. No. 62/587,649, filed Nov. 17, 2017, each of which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to non-emergency access in communication networks.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large amount of problems both in the system itself and in compatibility with previous systems and devices, issues continue to abound in existing systems. For example, issues still exist with access to the network for non-emergency services in the existing 3G and 4G system, which, if not corrected, may continue to be problematic in 5G systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
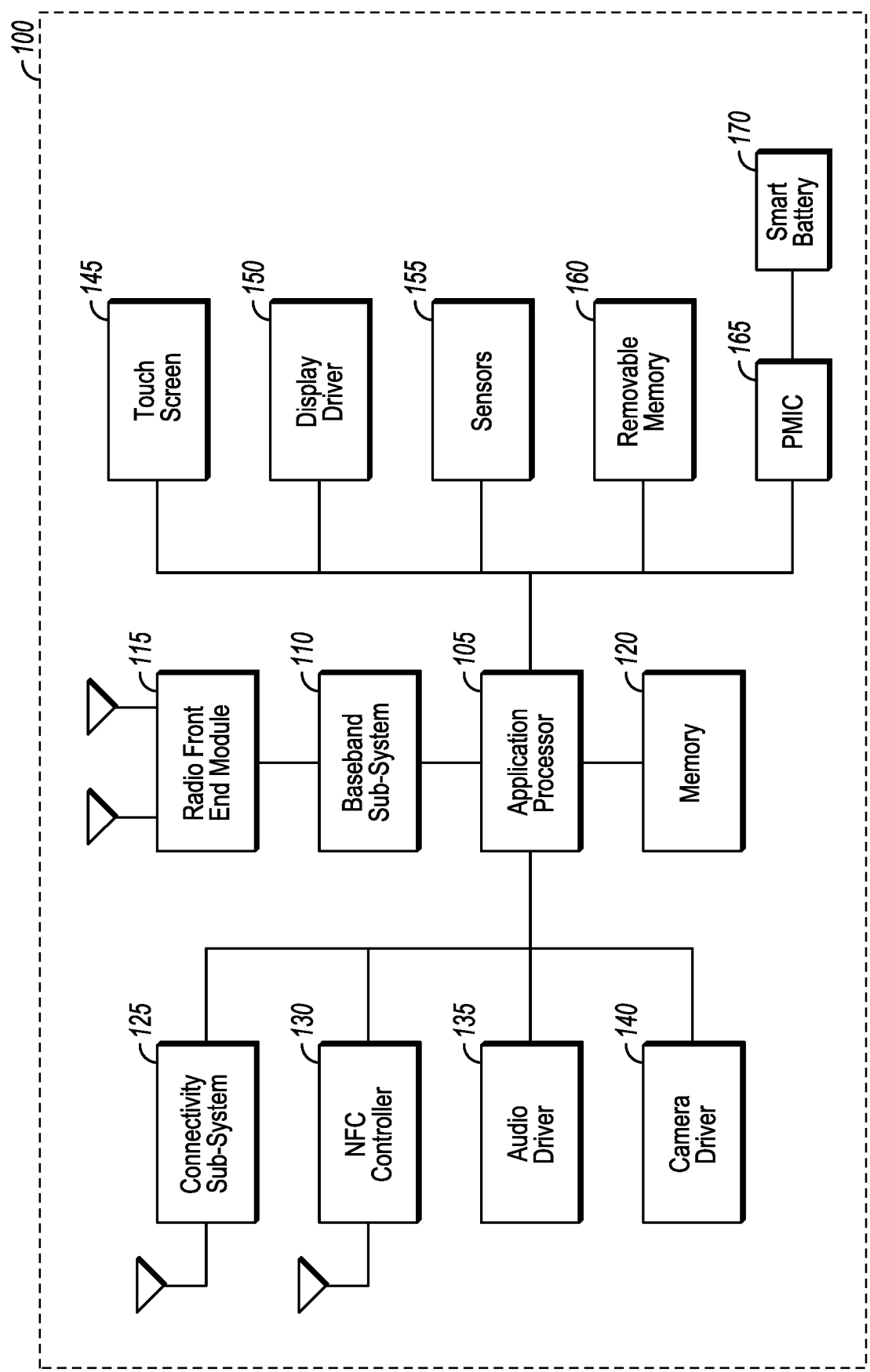
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio access technologies (RATs) described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, (3GPP NR), 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
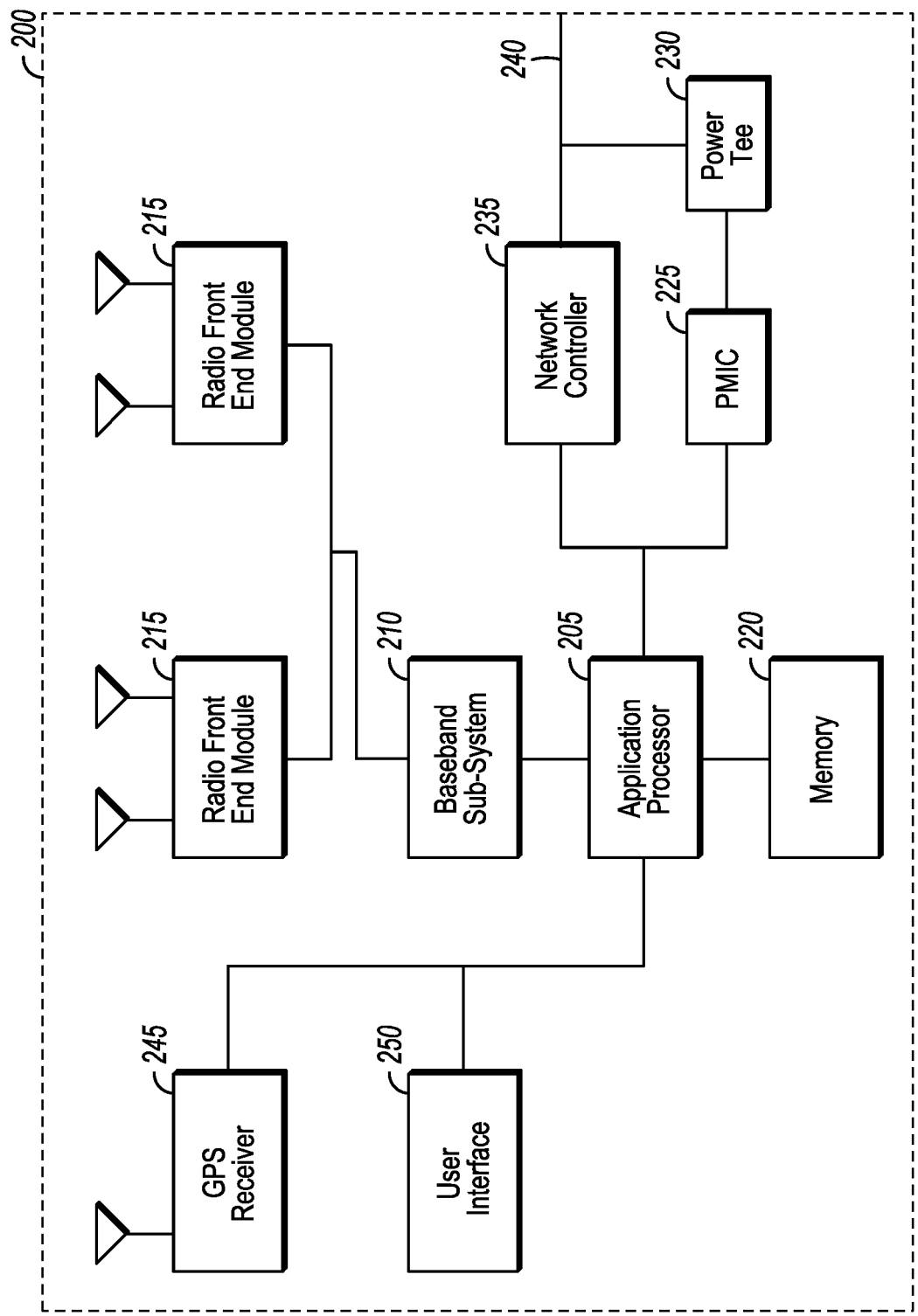
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
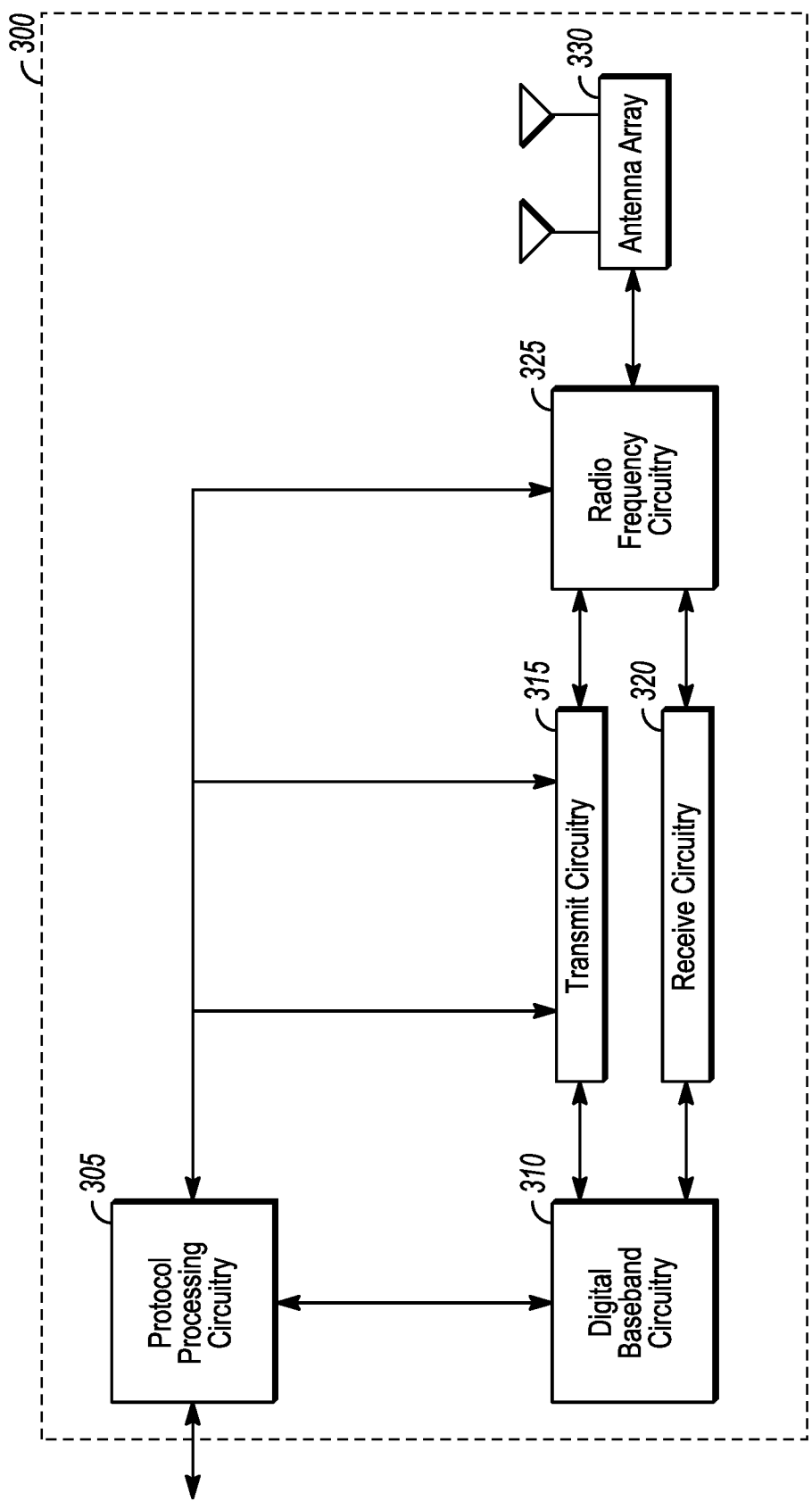
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, up conversion and down conversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, down converter and up converter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface subsystem may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
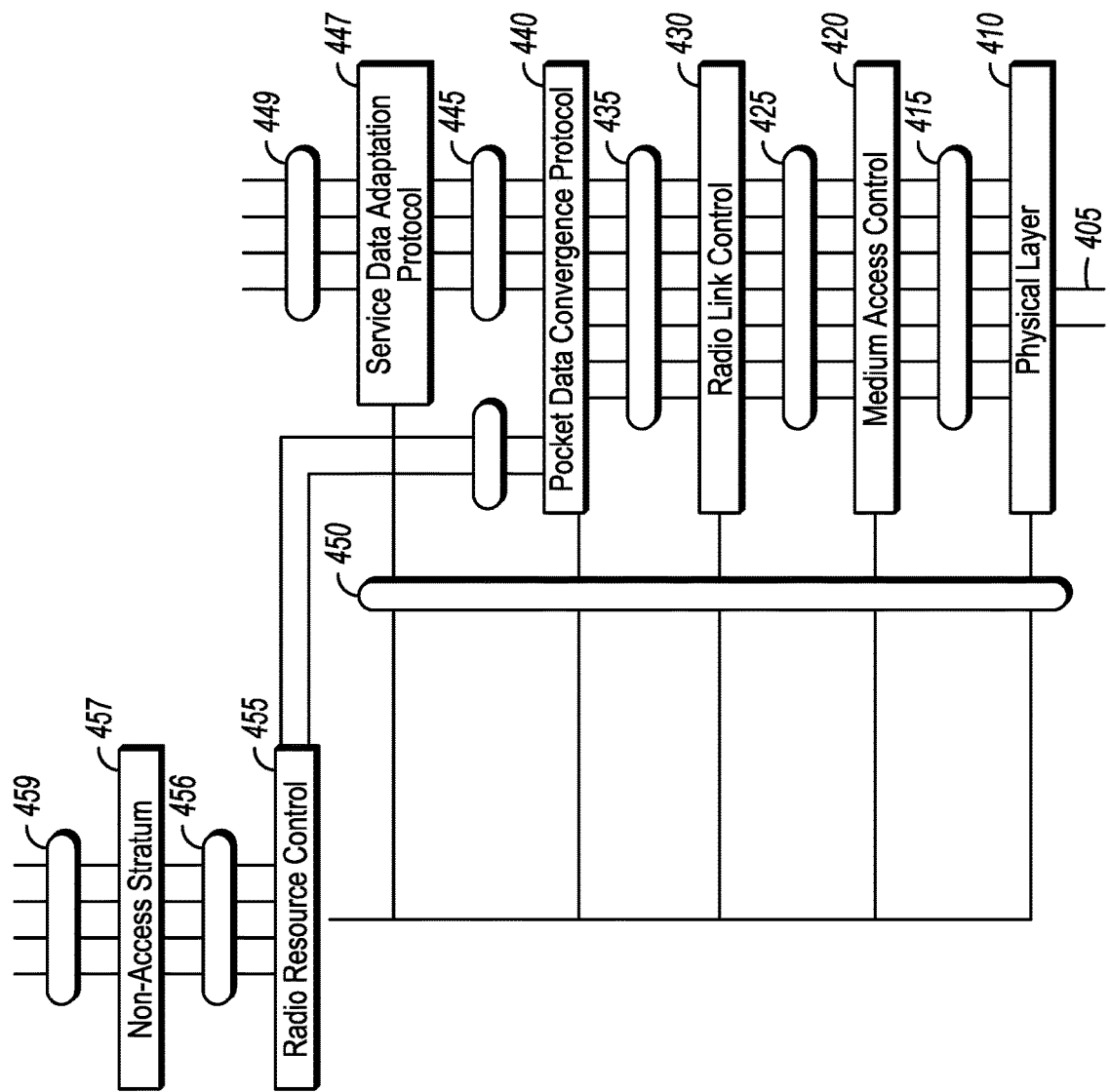
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
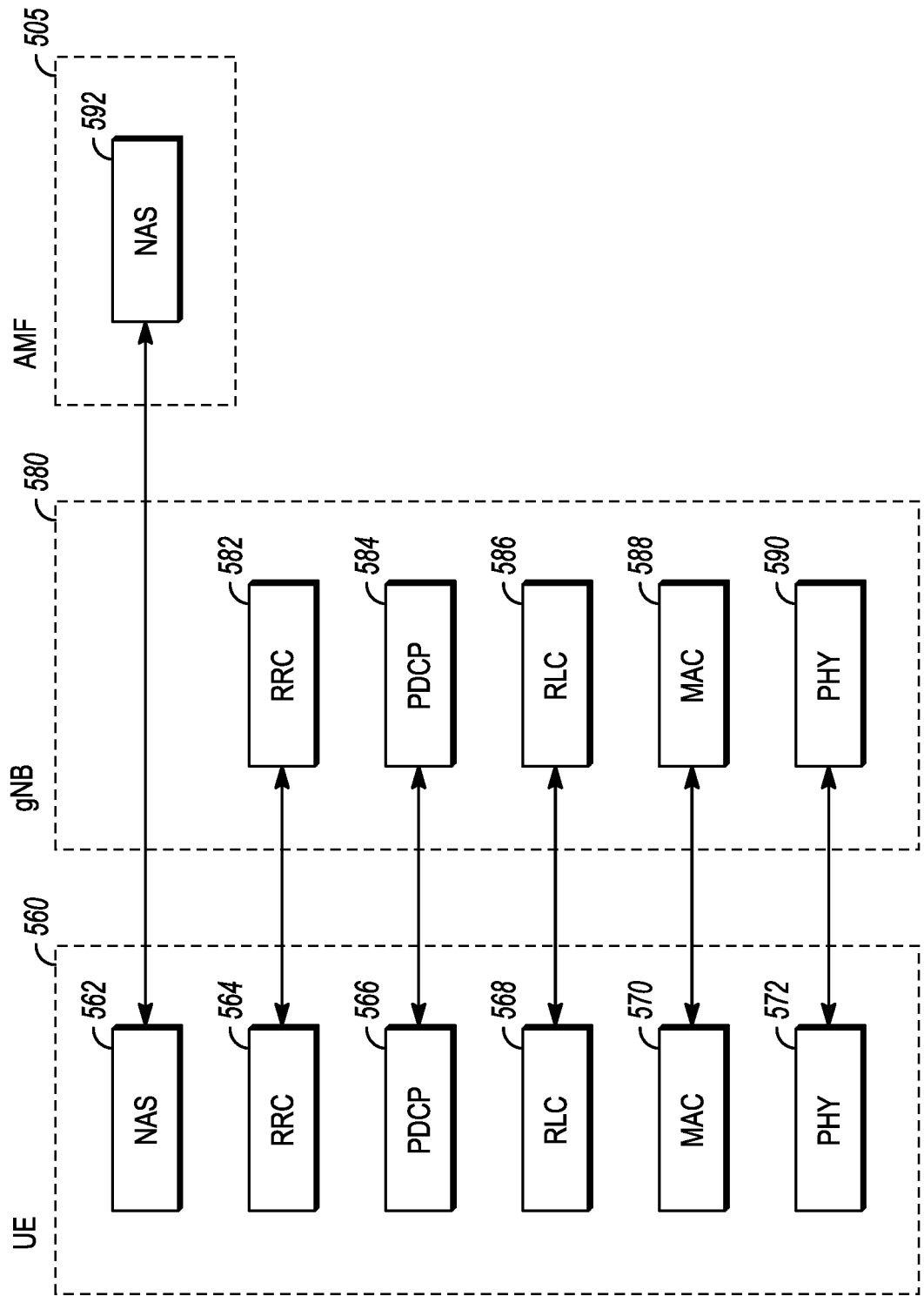
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and SGNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as 1/(30,720×1000) seconds. According to some aspects, a radio frame may be defined as having duration 30,720·$T_s$, and a slot may be defined as having duration 15,360·$T_s$. According to some aspects, $T_s$ may be defined as $$T_s = 1/(\Delta f_{max} \cdot N_f),$$

where $\Delta f_{max}$=480×10³ and Nf=4,096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams.

Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to layer $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{layer}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j 2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
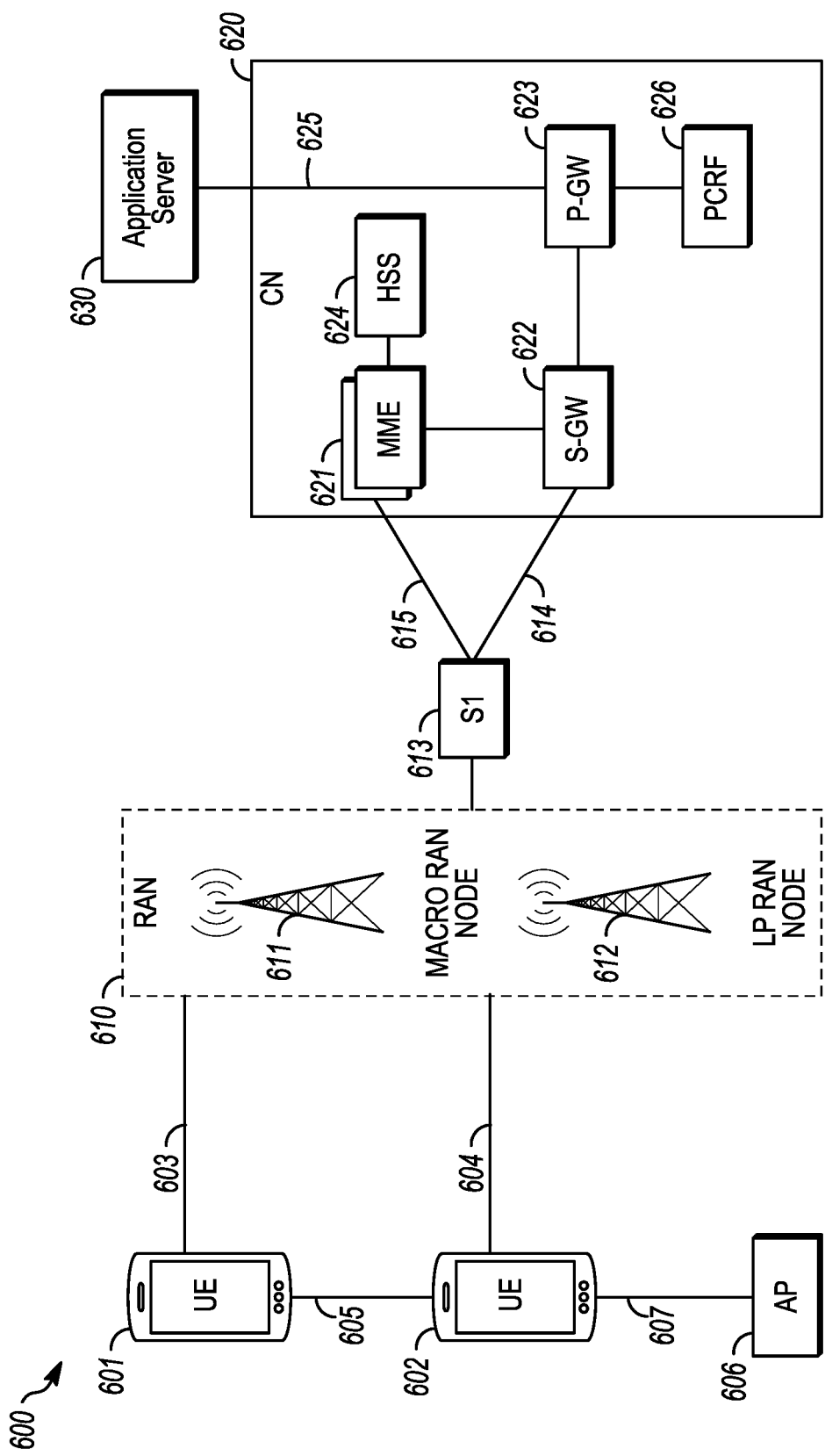
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

In the devices and systems above, a UE may send a service request to the network to request the establishment of a NAS signalling connection and the establishment of radio and/or S1 bearers. The service request may be sent by the UE for a variety of reasons, which may include when the UE is in the EMM-Idle mode and receives a paging request with a core network domain indicator set to "PS" (Public Safety) from the network, or when the UE has user data or uplink control signaling to be sent. The network may reject the service request; alternatively, the MME may initiate EMM common procedures e.g. authentication and security mode control procedures.

When attempting a service request for a non-emergency IMS call (also called multimedia telephony service (MM-TEL) call) transmitted from the UE to the network, a timer may be used to determine when to abort the service request procedure. The service request timer, timer T3417, may have a default value of 5 s and be used when the UE is in the EMM-SERVICEREQUEST INITIATED state. Timer T3417 normally stops when the bearers have been set up or the service request has been received and otherwise, the service request procedure aborted. The lack of response from the network may be due, among others, to channel conditions or a failure within the EPC.

The service request procedure may initiate a change of the EMM mode of the UE from EMM-IDLE to EMM-CONNECTED mode. The service request procedure may be used by the UE in EMM-IDLE mode to establish radio and S1 bearers when user data or signalling is to be sent by the UE or by the UE in EMM-IDLE or EMM-CONNECTED mode to invoke mobile originating (MO)/(MT) terminating CS fallback or 1xCS fallback.

The UE may attempt the service request procedure multiple times. A service request attempt counter may be used to avoid situations where the UE is stuck in a loop, attempting the service request when timer T3417 expires. This may occur, as above, when the UE does not receive a rejection from the MME, nor receive a radio bearer establishment indication from the access stratum. If the service request attempt counter is greater than or equal to 5, the UE may start timer T3325. The default value of timer T3325 is 60 Sec. While timer T3325 is in operation, no service request is permitted to be initiated by the UE.

The current 3GPP specification does not differentiate between a non-emergency IP Multimedia Subsystem (IMS) call and normal PS data. The latter of which may include SMS messages, web browsing and email, among others, for which users may be less sensitive compared with IMS calls. The operation of running of T3325 timer may result in mobile-originated IMS calls being blocked as the service request procedure is not allowed.

Some UE may be able to operate using different Radio Access Technologies (RATs). Such a multimode UE may have multiple options to make voice calls—like circuit-switched (CS) fallback, voice calls over the CS domain, voice over other IP Connectivity Access Network (IP-CAN) etc. However, the current 3GPP specification has not taken multimode operation into consideration to recover from the above issues in LTE RAT and to make a successful voice call by other means. Thus, during the service request procedure attempts, the UE is stuck retrying the IMS call on the EUTRAN without trying the CS-Domain or other IP-CANs available. Furthermore, once the service request attempt counter reaches the maximum number of attempts (e.g., 5-5 service requests to the network resulting in no response), the UE is not allowed to initiate the service request procedure for a duration of the T3325 timer (whose default value is 60 sec) after the last retry. In this case, if the user attempts to initiate an IMS call when timer T3325 is running, the UE is not allowed to initiate the service request procedure for establishing IMS bearer services, and eventually the call will fail. The service request attempt counter may increment independent of whether the SR attempts are caused by a non-emergency IMS call or PS data.

IMS emergency calls may avoid this problem by being a high priority and eliminating incrementing of the service request attempt counter for IMS emergency calls. In this case, when service requests are blocked due to the maximum failure attempt being reached and timer T3325 is running, a service request for an IMS emergency call may avoid being blocked. This, however, may not apply for non-emergency IMS voice calls.

Figure 7:
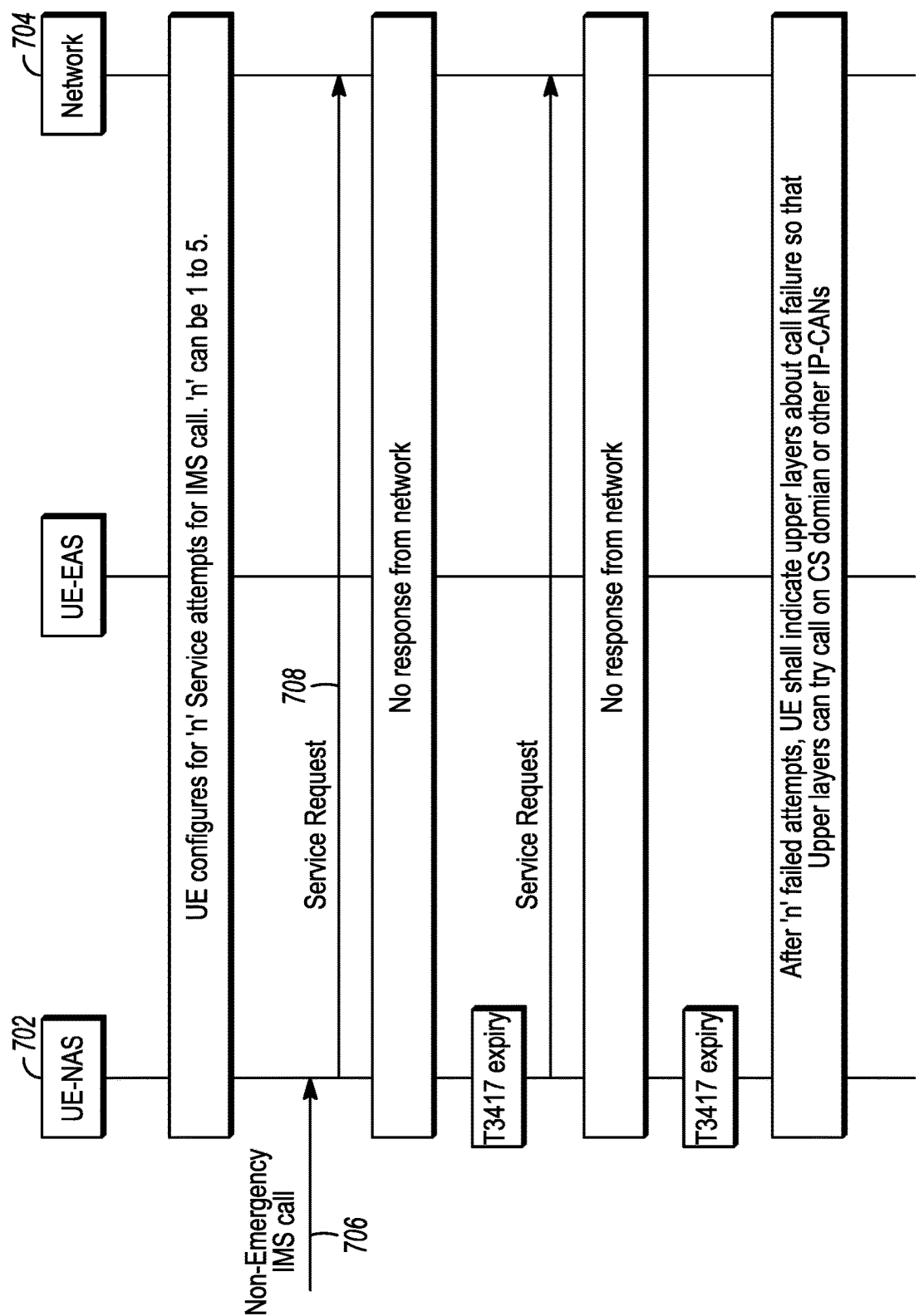
FIG. 7 illustrates a service request procedure in accordance with some embodiments.

To overcome the above issues, in some embodiments, non-emergency IMS calls may be treated differently from PS data service. This may be treated as an abnormal case as given in 3GPP TS 24.301, section 5.6.1.6. FIG. 7 illustrates a service request procedure in accordance with some embodiments. In particular, as shown in FIG. 7, before the service request 708 to the network 704 is blocked due to the service request attempt counter having reached the maximum value (e.g. 5) (i.e., T3325 is not running), the UE 702 may be allowed to perform the service request procedure for a non-emergency IMS call 706 for a configurable maximum number 'n' of attempts (e.g. with 'n' configurable in the range 1 to 5). After the 'n'th T3417 timer expiry, the UE 702 may indicate IMS call failure to the upper layers of the UE 702. The service request procedure may include the UE encoding a service request for transmission to the network, where, when received the service request is decoded and the network takes the appropriate action.

Figure 8:
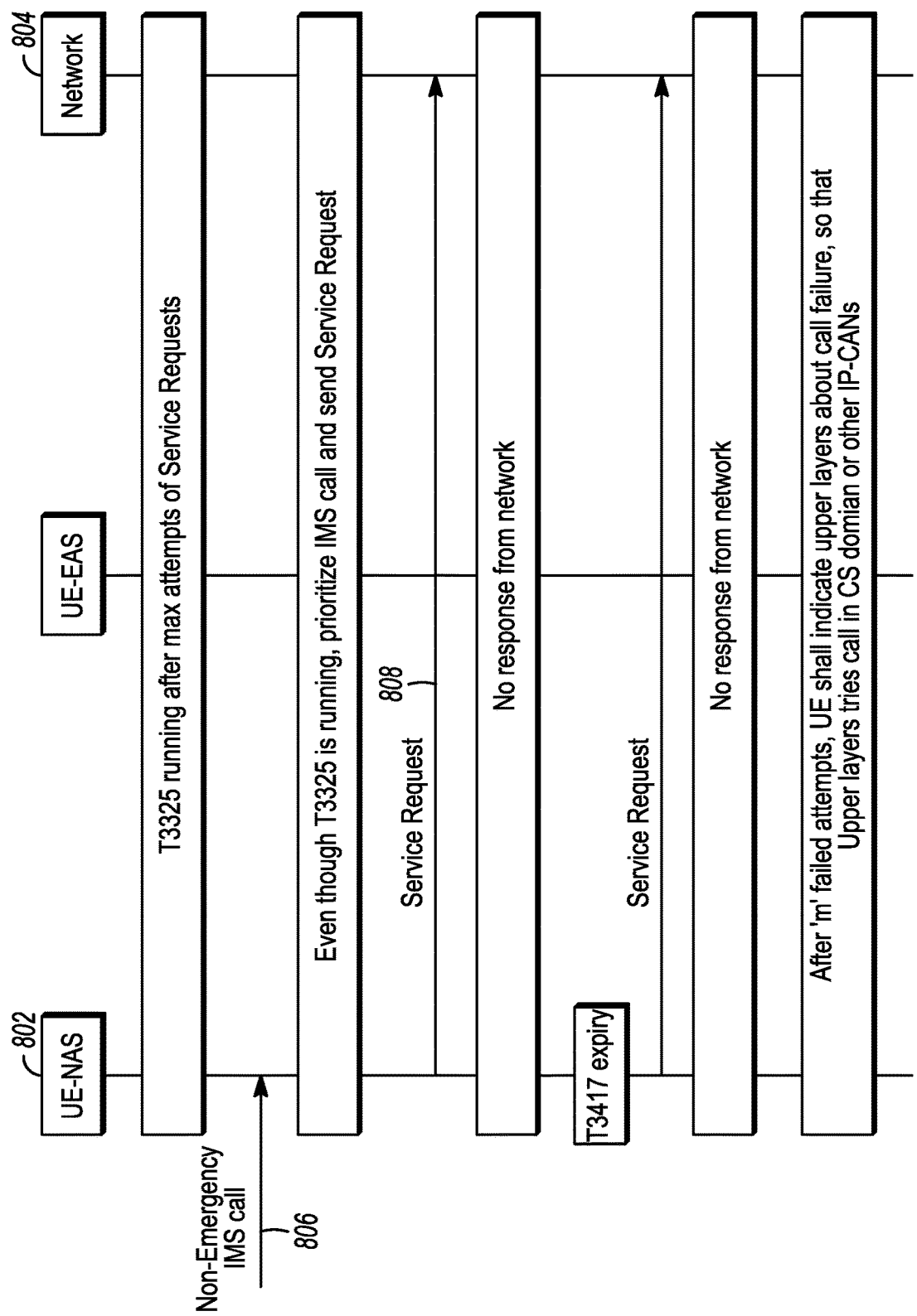
FIG. 8 illustrates a service request procedure in accordance with some embodiments.

This can be extended to encompass the case in which T3325 is running. FIG. 8 illustrates a service request procedure in accordance with some embodiments. In particular, as shown in FIG. 8, even when the service request 808 to the network 804 is blocked due to the service request attempt counter having reached the maximum value (e.g. 5-5 service requests 808 to the network 804 resulting in no response) and T3325 is running, the UE 802 may be allowed to perform the service request procedure for a non-emergency IMS call 806 for a configurable maximum number 'm' of attempts (e.g. with 'm' configurable in the range 0 to 5). After the 'm'th T3417 timer expiry, the UE 802 may indicate IMS call failure to the upper layers.

The indication to the upper layers may result in trying the call on the CS domain, if not already attempted or any other available IP-CAN. The domains may be prioritized so that if multiple domains are available, the domain used may be selected using the prioritization. The values m and n may be to different and, in some embodiments, may not be configurable by the UE or network (i.e., set by the 3GPP standards). The indication may result in the UE trying the IMS call on CS domain or any other available IP-CAN, if not already attempted.

Figure 9:
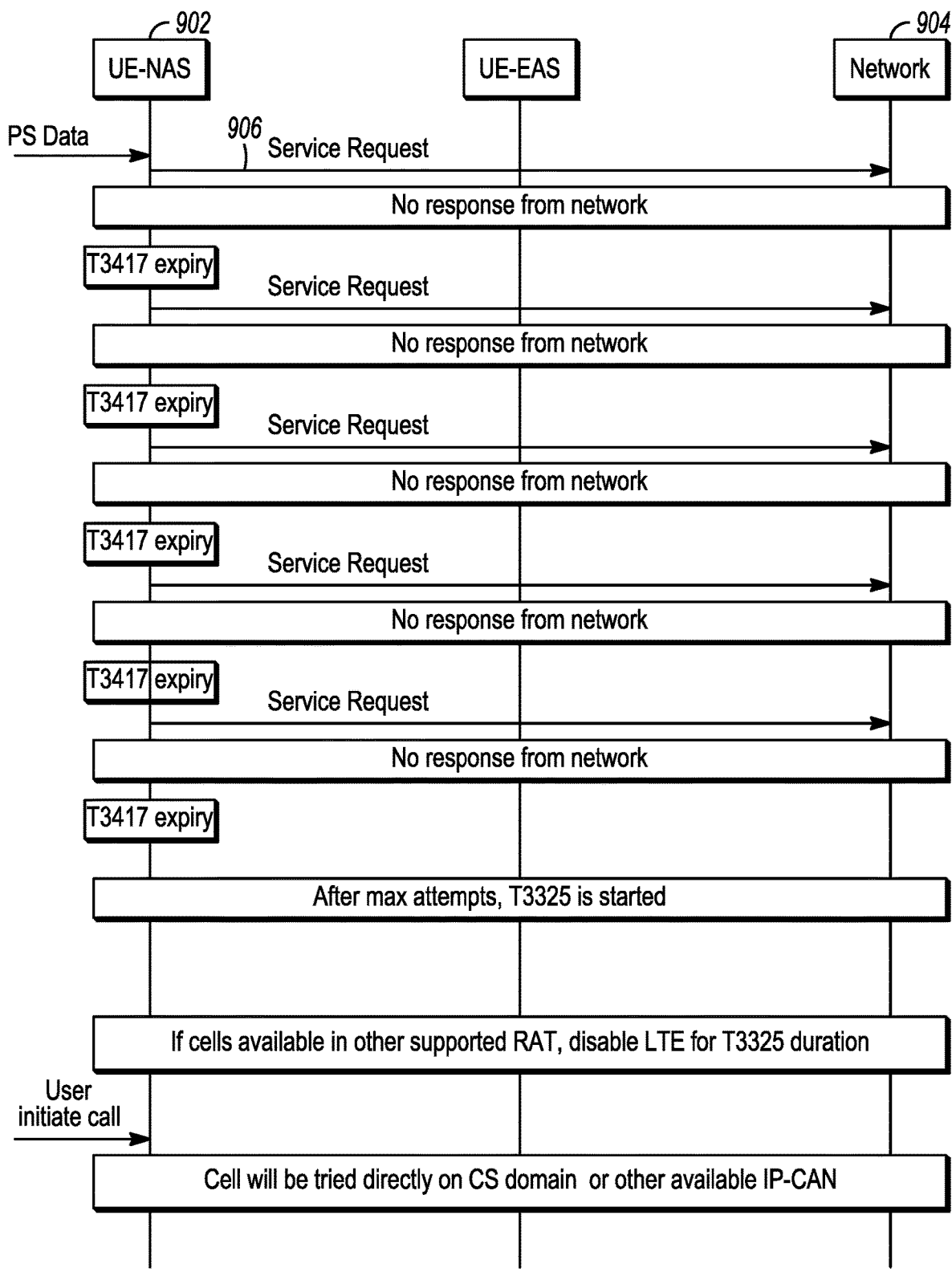
FIG. 9 illustrates a service request procedure in accordance with some embodiments.

FIG. 9 illustrates a service request procedure in accordance with some embodiments. As shown, multiple service requests 906 may be transmitted from the UE 902 to the network 904. In some embodiments, if the service request attempt counter has reached the maximum value (e.g. 5) due to a service request procedure failure, after starting timer T3325, the UE 902 can disable the E-UTRA capability for the T3325 duration (as per 3GPP TS 24.301 Section 4.5). The UE 902 store in memory the identity of the PLMN where the E-UTRA capability was disabled and use the stored information in subsequent PLMN selections as specified in 3GPP TS 23.122. While the timer T3325 is running and an IMS call is initiated, the UE 902 may also try the IMS call on another RAT. The available RATs may be stored in the UE memory and attempts made based on RAT prioritizations also stored in the UE memory. The prioritizations may be based, for example, on UE characteristics or RAT traffic.

Figure 10:
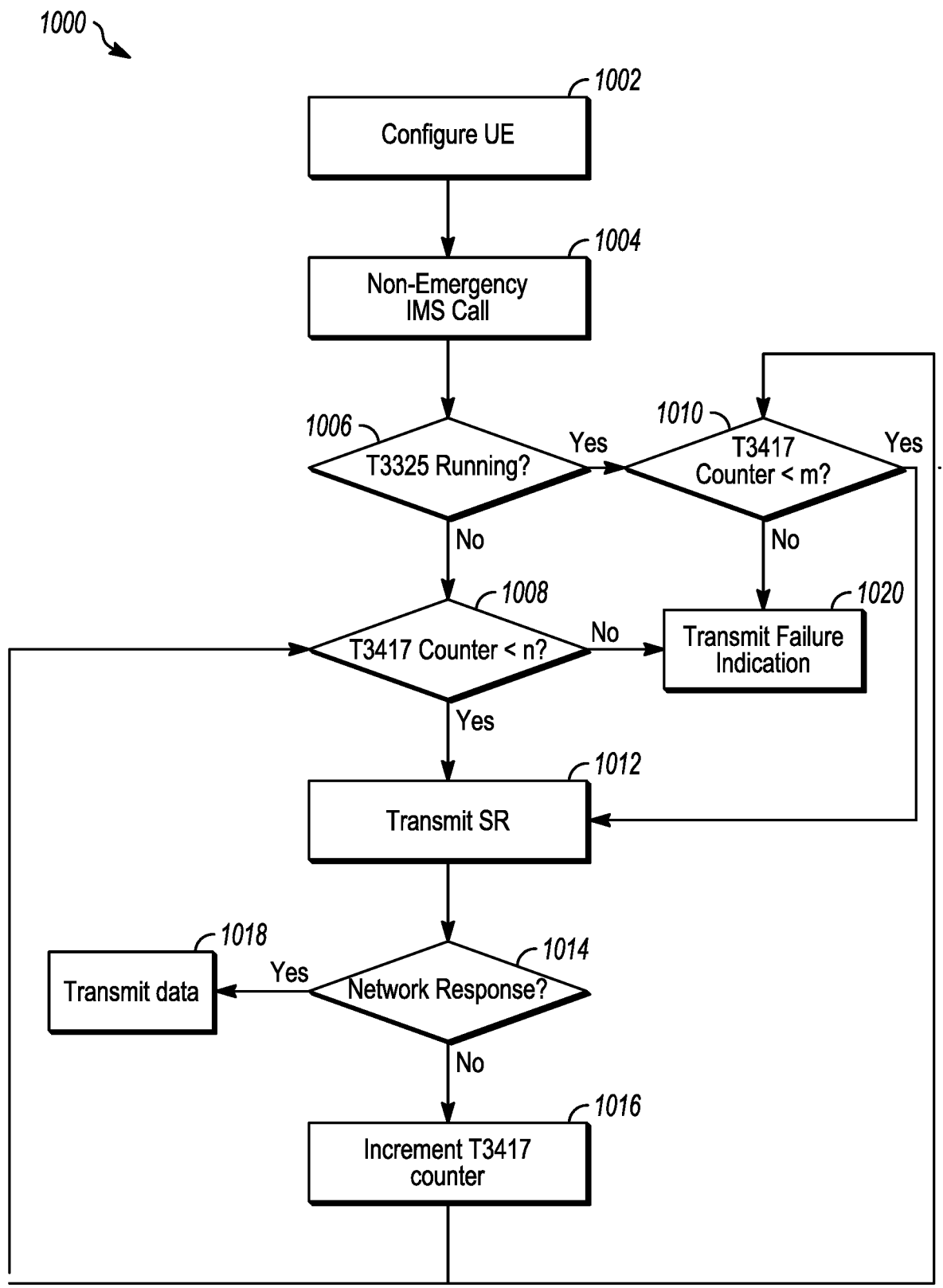
FIG. 10 illustrates a flowchart of a service request procedure in accordance with some embodiments.

FIG. 10 illustrates a flowchart of a service request procedure in accordance with some embodiments. The operations of the flowchart 1000 may be undertaken by the UE shown and described above and may have additional operations or fewer operations than that shown. For example, operations that show the UE attempting to find a cell on another supported RAT (CS domain or other available IP-CAN) after the T3325 timer is started, and, if found, disabling the E-UTRA capability for the T3325 timer duration for the current PLMN so that if there is an IMS call, the other domain may be used are not provided in FIG. 10. Such operations may be added after operation 1020, for example.

As shown in FIG. 10, the UE may be configured at operation 1002 with one or both of the maximum number of service request attempts (dependent on whether timer T3325 is running) for an IMS call. In some embodiments, either or both the maximum number of attempts may be configured multiple maximum number of attempts, the maximum number of attempts used may be dependent on the UE or user (e.g., user priority, for to example if the user is an emergency service provider) and/or the circumstances of the service request not being fulfilled (e.g., no response from the network, network congestion, network failure). The number of service attempts may be, in some examples, 1-5. In some embodiments, a managed object (MO) may be used to introduce the counter values. This value may be used if not updated. In other embodiments, the maximum number of attempts may not be configurable but may be set to a predetermined number dependent on the standard (as above, 5).

In FIG. 10, the IMS call may be given higher priority than PS data during the service request procedure. Thus, the UE may at operation 1004 determine that an IMS call is to be placed and perform a different procedure than if the service request is to be for a PS data transmission.

When the UE determines that an IMS call is to be placed, the UE may determine at operation 1006 whether the T3325 timer is running. In other words, the UE may determine whether service requests for a previous IMS call or PS data transmission has caused the T3417 counter to exceed the maximum value. Although not shown, the T3417 counter may be reset prior to initiation of the T3325 timer, such as after the maximum count has been reached, after transmission of the data or after transmission of the failure indication described below.

If the T3325 timer is running, the UE may determine at operation 1010 whether the T3417 counter has exceeded a first (configured) counter (maximum number of service requests) when the T3325 timer is running. Similarly, if the T3325 timer is not running, the UE may determine at operation 1008 whether the T3417 counter has exceeded a second (configured) counter when the T3325 timer is not running. As above, in some embodiments the first and second maximum number of service requests may be independent—e.g., they may be different. Alternatively, the first and second counter may be the same, e.g., 5, as determined by the standard.

Whether or not the T3325 timer is running, if the first or second counter (dependent on whether or not the T3325 timer is running) has been met, the failure may be indicated to the upper layers. In some embodiments, this may to result in the UE determining which IP-CANs are available and which IP-CANs the UE has already attempted to use for the IMS call. For example, the UE may try the IMS call on the CS domain if not already attempted. This may involve the UE registering on the other RAT, among other procedures.

Dependent on whether or not the T3325 timer is running, if the first or second counter has not been met, the UE may at operation 1012 transmit the service request to the network. Thus, in some situations, even when service request is blocked due to the service request attempt counter having reached the value of 5 and the T3325 timer running, the UE may be permitted to perform the service request procedure for a non-emergency IMS call.

After transmission of the service request, the UE may wait for a response from the network. Similar to the above, the UE may activate the T3417 timer to determine whether or not a response has been received. If a response has not been received by the time the T3417 timer expires, the UE may at operation 1016 increment the first or second counter (again, dependent on whether or not the T3325 timer is running) and then return to operation 1008. If, on the other hand, the network responds with an uplink grant (indicating that the appropriate bearers have been established), at operation 1018 the UE may transmit the data on the uplink grant.

As above, 3GPP TS 24.301, subclause 5.6.1.6 may be adjusted for the abnormal case of the T3417 timer having expired. As above, the UE may enter the EMM-REGISTERED state. If the UE triggered the service request procedure in EMM-IDLE mode to obtain packet services, then the EMM sublayer may increment the service request attempt counter, abort the procedure and release locally any resources allocated for the service request procedure. If the service request attempt counter is greater than or equal to 5, the UE may start timer T3325. Additionally, if the service request is initiated for a mobile originated MMTEL voice call then the UE may inform the upper layers of the failure to establish the connection. This can result in the upper layers requesting establishment of a voice call (if not already attempted in the CS domain), or other implementation-specific mechanisms can result in the MMTEL call being attempted using another IP-CAN. The UE may not attempt a service request until expiry of timer T3325 unless the UE is registered in a new PLMN.

In some embodiments, this procedure can be generalized to a multimode UE initially attempting to access the network via a first RAT (above the LTE network, but in other embodiments, another IP-CAN). The first RAT may offer both voice and data services. The UE may wait for a response from the network. If the UE does not receive a response from the network within a time interval T1, the UE may subsequently re-attempt the access to the network via the first RAT. The UE may continue to re-attempt network access via the first RAT a predetermined number of times. Once the predetermined number of re-attempts has occurred (due to non-responses from the network), the UE may refrain during a time interval T2 from further access attempts for a first purpose (or that are not for a second purpose) via the first RAT. Thus, for example, the UE may refrain from further access attempts for a first purpose of data services or may permit further access attempts for a second purpose of voice services during the time interval T2. While in some embodiments, the UE may refrain during the time interval T2 from further access attempts via the first RAT for any purpose, the UE may permit access attempts via a second RAT for the second purpose (e.g., voice services) during the time interval T2 (but not for the first purpose). In this case, the UE may disable the first RAT during the time interval T2. In some situations, the UE may thus move transmission of service requests for, say voice services, after a threshold number of service request attempts from the first RAT to the second RAT (where if the threshold number is 0, the transmission is moved immediately or directly from the first RAT to the second RAT). The UE may be limited to a single second RAT during the time interval T2 or may try to access the network via multiple RATs in a previously prioritized order. The number of attempts made using each RAT may be the same, or may be independent of each other and may be dependent on the type of RAT used.

In some embodiments, the first RAT may be Evolved Universal Mobile Telecommunications System Terrestrial Radio Access Network (E-UTRAN) and the second RAT may be a Global System for Mobile communication (GSM)/Edge Radio Access Network (GERAN) or UTRAN supporting voice services via circuit-switched (CS) domain or an Internet Protocol (IP)-Connectivity Access Network (IP-CAN) for an IP Multimedia Subsystem (IMS) supporting voice services. The IP-CAN may be a wireless local area network (WLAN) or a General Packet Radio System (GPRS).

Thus, different embodiments may indicate changes when the service request attempt occurs while T3325 time is not running, and T3325 timer is started due to this failure and when a new service request attempt occurs while T3325 is already running. In the latter embodiment with the parameter 'm'=0 (if new service request attempt occurs while T3325 is already running), the notification may be provided to the upper layers immediately, without trying to send the service request. In the latter embodiment with the parameter 'm'=1, the UE may be permitted to send the service request once while T3325 is already running. If the T3417 timer then expires, the notification may be provided to the upper layers.

EXAMPLES

Example 1 is an apparatus of a user equipment (UE), the apparatus comprising: processing circuitry arranged to: determine whether user data to be transmitted to a network is non-emergency user data or emergency user data; if a T3325 timer is not running: initiate transmission of a service request to the network and initiate a T3417 timer; increment a service request attempt counter if a response to the service request has not been received from the network before expiration of the T3417 timer and if the user data is non-emergency user data; and initiate the T3325 timer if the service request attempt counter at least meets a predetermined value; and if the T3325 timer is running: if the service request is initiated for a multimedia telephony (MMTEL) call, attempt to establish the MMTEL call on an alternative radio access network; and a memory arranged to store the predetermined value.

In Example 2, the subject matter of Example 1 includes, wherein the processing circuitry is further arranged to: attempt to establish the MMTEL call as a circuit switched (CS) voice call if not already attempted in a CS domain.

In Example 3, the subject matter of Example 2 includes, timer is running: notify upper layers that the service request was not accepted, wherein notification is dependent on whether the service request is initiated for the MMTEL call; and receive a request from the upper layers to establish the CS voice call if the CS voice call is not already attempted in a CS domain.

In Example 4, the subject matter of Example 3 includes, wherein the processing circuitry is further arranged to: provide the notification if the service request attempt counter at least meets the predetermined value.

In Example 5, the subject matter of Example 4 includes, wherein: the predetermined value is 5.

In Example 6, the subject matter of Examples 1-5 includes, wherein the processing circuitry is further arranged to: increment the service request attempt counter if the UE is in EMM-Idle mode and a service request procedure is triggered.

In Example 7, the subject matter of Example 6 includes, wherein the processing circuitry is further arranged to: abort the service request procedure and release locally any resources allocated for the service request procedure in response to expiration of the T3417 timer.

In Example 8, the subject matter of Examples 1-7 includes, wherein the processing circuitry is further arranged to: refrain from incrementing the service request attempt counter for emergency user data.

In Example 9, the subject matter of Examples 1-8 includes, wherein the processing circuitry is further arranged to: use a different radio access technology (RAT) for the MMTEL call if the T3325 timer is running than if the T3325 timer is not running.

In Example 10, the subject matter of Example 9 includes, wherein the processing circuitry is further arranged to: use Long Term Evolution (LTE) if the T3325 timer is not running, regardless of whether the service request is for the MMTEL call, and use CS fallback for a non emergency voice call over the CS domain if the T3325 timer is running.

In Example 11, the subject matter of Examples 9-10 includes, wherein the processing circuitry is further arranged to: prioritize a plurality of RATs; and use, to transmit the service request over a highest priority RAT for which the service request attempt counter has not reached a predetermined value, if the T3325 timer is running.

In Example 12, the subject matter of Examples 1-11 includes, wherein the processing circuitry is further arranged to: treat a non-emergency voice call and data differently if the T3325 timer is running, at least one service request for the non-emergency voice call transmitted if the T3325 timer is running and service requests for the data being prevented from being transmitted over a same radio access technology (RAT) if the T3325 timer is running.

In Example 13, the subject matter of Examples 1-12 includes, wherein: the predetermined value of the service request attempt counter if the T3325 timer is running is independent of the predetermined value of the service request attempt counter if the T3325 timer is not running.

In Example 14, the subject matter of Examples 1-13 includes, wherein: the predetermined value of the service request attempt counter if the T3325 timer is running is the same as the predetermined value of the service request attempt counter if the T3325 timer is not running.

In Example 15, the subject matter of Examples 1-14 includes, wherein the processing circuitry is further arranged to: prevent, if the T3325 timer is running, service requests from being transmitted on a Radio Access Technology (RAT) that is used if the T3325 timer is not running.

In Example 16, the subject matter of Examples 1-15 includes, wherein: the processing circuitry comprises a baseband processor configured to encode transmissions to, and decode transmissions from, the network.

Example 17 is an apparatus of a user equipment (UE), the apparatus comprising: processing circuitry arranged to: initiate repeated operations that comprise the processing circuitry being arranged to: encode a service request for transmission to a network via a first radio access technology (RAT); determine whether a response to the service request has been received from the network within a first time period; in response to a determination that the response has not been received within the first time period, increment a counter; and after incrementation of the counter, determine whether the counter has at least reached a predetermined value; in response to a determination that the counter is less than the predetermined value, return to the repeated operations; and in response to a determination that the counter has at least reached the predetermined value, refrain from further transmission of service requests for data services and initiate further transmission of service requests for non-emergency voice services.

In Example 18, the subject matter of Example 17 includes, wherein the processing circuitry is further arranged to: initiate further transmission of service requests for non-emergency voice services during a second time period via a second RAT.

In Example 19, the subject matter of Example 18 includes, wherein the processing circuitry is further arranged to: refrain from transmission of service requests for non-emergency voice services during the second time period via the first RAT, if a number of transmissions via the first RAT for which the UE did not receive a response from the network within the first time period is at least a threshold value.

In Example 20, the subject matter of Example 19 includes, wherein: the threshold value is zero, transmissions of the service requests are moved immediately from the first RAT to the second RAT.

In Example 21, the subject matter of Examples 18-20 includes, wherein the processing circuitry is further arranged to: refrain from transmission of service requests for non-emergency voice services outside of the second time period via the first RAT, if a number of transmissions via the first RAT for which the UE did not receive a response from the network within the first time period is at least another threshold value.

In Example 22, the subject matter of Examples 17-21 includes, wherein the processing circuitry is further arranged to: initiate further transmission of service requests for non-emergency voice services during a second time period via the first RAT.

In Example 23, the subject matter of Examples 17-22 includes, wherein: the first RAT is an Evolved Universal Mobile Telecommunications System Terrestrial Radio Access Network (E-UTRAN) and the second RAT is a Global System for Mobile communication (GSM)/Edge Radio Access Network (GERAN) or UTRAN supporting voice services via circuit-switched (CS) domain or an Internet Protocol (IP)-Connectivity Access Network (IP-CAN) for an IP Multimedia Subsystem (IMS) supporting voice services.

In Example 24, the subject matter of Example 23 includes, wherein: the IP-CAN is a wireless local area network (WLAN) or a General Packet Radio System (GPRS).

In Example 25, the subject matter of Examples 23-24 includes, wherein the processing circuitry is further arranged to: in response to a determination that the counter has at least reached the predetermined value, attempt to select a second RAT that supports voice services from a plurality of RATs; and in response to finding the second RAT, disable operation of the UE in the first RAT for a time period T3.

Example 26 is a computer-readable storage medium that stores instructions for execution by one or more processors of a user equipment (UE), the one or more processors to configure the UE to, if the instructions are executed: receive a request to transmit a user data to a network; determine whether a T3325 timer is running, the T3325 timer initiated if a service request attempt counter at least meets a predetermined value; increment the service request attempt counter each time a response to a service request to a network has not been received from the network before expiration of a T3417 timer; and transmit a service request to the network if the T3325 timer is running and the service request is for a non-emergency multimedia telephony (MMTEL) voice call and refrain from transmission of the service request if the T3325 timer is running and the service request is for non-emergency data that is not the MMTEL call.

In Example 27, the subject matter of Example 26 includes, wherein the instructions, when executed, further configure the UE to: transmit the service request on a different radio access technology (RAT) dependent on whether the T3325 timer is running, and use Long Term Evolution (LTE) if the T3325 timer is not running and use circuit-switched (CS) fallback if the T3325 timer is running.

In Example 28, the subject matter of Examples 26-27 includes, wherein the instructions, when executed, further configure the UE to: prioritize a plurality of RATs; and use, to transmit the service request if the T3325 timer is running, a highest priority RAT for which the service request attempt counter has not reached a predetermined value.

In Example 29, the subject matter of Examples 26-28 includes, wherein the instructions, when executed, further configure the UE to: determine that the service request attempt counter at least meets the predetermined value and inform upper layers that the service request attempt counter at least meets the predetermined value and subsequently use a different RAT to transmit the service request to the network.

In Example 30, the subject matter of Examples 26-29 includes, wherein the instructions, when executed, further configure the UE to: prevent, if the T3325 timer is running, service requests from being transmitted on a RAT used if the T3325 timer is not running.

Example 31 is an apparatus of a user equipment (UE), the apparatus comprising: means for determining whether user data to be transmitted to a network is non-emergency user data or emergency user data; if a T3325 timer is not running: means for initiating transmission of a service request to the network and initiate a T3417 timer; means for incrementing a service request attempt counter if a response to the service request has not been received from the network before expiration of the T3417 timer and if the user data is non-emergency user data; and means for initiating the T3325 timer if the service request attempt counter at least meets a predetermined value; and if the T3325 timer is running: if the service request is initiated for a multimedia telephony (MMTEL) call, means for attempting to establish the MMTEL call on an alternative radio access network.

In Example 32, the subject matter of Example 31 includes, means for attempting to establish the MMTEL call as a circuit switched (CS) voice call if not already attempted in a CS domain.

In Example 33, the subject matter of Example 32 includes, timer is running: means for notifying upper layers that the service request was not accepted, wherein notification is dependent on whether the service request is initiated for the MMTEL call; and means for receiving a request from the upper layers to establish the CS voice call if the CS voice call is not already attempted in a CS domain.

In Example 34, the subject matter of Example 33 includes, means for providing the notification if the service request attempt counter at least meets the predetermined value.

In Example 35, the subject matter of Example 34 includes, wherein: the predetermined value is 5.

In Example 36, the subject matter of Examples 31-35 includes, means for incrementing the service request counter if the UE is in EMM-Idle mode and a service request procedure is triggered.

In Example 37, the subject matter of Example 36 includes, means for aborting the service request procedure and release locally any resources allocated for the service request procedure in response to expiration of the T3417 timer.

In Example 38, the subject matter of Examples 31-37 includes, means for refraining from incrementing the service request attempt counter for emergency user data.

In Example 39, the subject matter of Examples 31-38 includes, means for using a different radio access technology (RAT) for the MMTEL call if the T3325 timer is running than if the T3325 timer is not running.

In Example 40, the subject matter of Example 39 includes, means for using Long Term Evolution (LTE) if the T3325 timer is not running, regardless of whether the service request is for the MMTEL call, and use CS fallback for a non emergency voice call over the CS domain if the T3325 timer is running.

In Example 41, the subject matter of Examples 39-40 includes, to means for prioritizing a plurality of RATs; and means for using, to transmit the service request if the T3325 timer is running, a highest priority RAT for which the service request attempt counter has not reached a predetermined value.

In Example 42, the subject matter of Examples 39-41 includes, means for transmitting the service request to the network via the RAT.

In Example 43, the subject matter of Examples 31-42 includes, means for treating a non-emergency voice call and data differently if the T3325 timer is running, at least one service request for the non-emergency voice call transmitted if the T3325 timer is running and service requests for the data being prevented from being transmitted over a same radio access technology (RAT) if the T3325 timer is running.

In Example 44, the subject matter of Examples 31-43 includes, wherein: the predetermined value of the service request attempt counter if the T3325 timer is running is independent of the predetermined value of the service request attempt counter if the T3325 timer is not running.

In Example 45, the subject matter of Examples 31-44 includes, wherein: the predetermined value of the service request attempt counter if the T3325 timer is running is the same as the predetermined value of the service request attempt counter if the T3325 timer is not running.

In Example 46, the subject matter of Examples 31-45 includes, means for preventing, if the T3325 timer is running, service requests from being transmitted on a Radio Access Technology (RAT) that is used if the T3325 timer is not running.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory computer-readable storage medium that stores instructions for execution by one or more processors of a user equipment (UE), the one or more processors to configure the UE to, execute the instructions to:
  for a service request procedure that includes initiation of a service request:
    when a T3325 timer is not running:
      initiate transmission of the service request to a network and initiate a T3417 timer;

increment a service request attempt counter when a response to the service request has not been received from the network before expiration of the T3417 timer and user data is non-emergency user data; and initiate the T3325 timer when the service request attempt counter at least meets a predetermined value; and when the T3325 timer is running and the service request was initiated for a non-emergency multimedia telephony (MMTEL) call:

notify upper layers that the service request was not accepted, and receive a request from the upper layers to establish a circuit switched (CS) voice call when not already attempted in a CS domain.

2. The medium of claim 1, wherein the instructions, when executed, further configure the UE to provide a notification when the service request attempt counter at least meets the predetermined value.

3. The medium of claim 2, wherein the predetermined value is 5.

4. The medium of claim 1, wherein the instructions, when executed, further configure the UE to increment the service request attempt counter when the UE is in EMM-Idle mode and a service request procedure is triggered.

5. The medium of claim 4, wherein the instructions, when executed, further configure the UE to abort the service request procedure and release locally any resources allocated for the service request procedure in response to expiration of the T3417 timer.

6. The medium of claim 1, wherein the instructions, when executed, further configure the UE to refrain from incrementing the service request attempt counter for emergency user data.

7. The medium of claim 1, wherein the instructions, when executed, further configure the UE to use a different radio access technology (RAT) for the MMTEL call when the T3325 timer is running than when the T3325 timer is not running.

8. The medium of claim 7, wherein the instructions, when executed, further configure the UE to use Long Term Evolution (LTE) when the T3325 timer is not running, regardless of whether the service request is for the MMTEL call, and use CS fallback for a non emergency voice call over the CS domain when the T3325 timer is running.

9. The medium of claim 7, wherein the instructions, when executed, further configure the UE to:

prioritize a plurality of RATs; and use, to transmit the service request over a highest priority RAT for which the service request attempt counter has not reached a predetermined value, when the T3325 timer is running.

10. The medium of claim 1, wherein the instructions, when executed, further configure the UE to treat a non-emergency voice call and data differently when the T3325 timer is running, at least one service request for the non-emergency voice call transmitted when the T3325 timer is running and service requests for the data being prevented from being transmitted over a same radio access technology (RAT) when the T3325 timer is running.

11. The medium of claim 1, wherein the predetermined value of the service request attempt counter when the T3325 timer is running is independent of the predetermined value of the service request attempt counter when the T3325 timer is not running.

12. The medium of claim 1, wherein the predetermined value of the service request attempt counter when the T3325 timer is running is identical to the predetermined value of the service request attempt counter when the T3325 timer is not running.

13. The medium of claim 1, wherein the instructions, when executed, further configure the UE to prevent, when the T3325 timer is running, service requests from being transmitted on a Radio Access Technology (RAT) that is used when the T3325 timer is not running.

* * * * *